United States Patent [19]

DeWoolfson

[11] Patent Number: 5,226,519
[45] Date of Patent: Jul. 13, 1993

[54] MULTIPLE USE COMMODITY COLLECTION AND STORAGE SYSTEM

[75] Inventor: Bruce H. DeWoolfson, Vienna, Va.

[73] Assignee: Environmental Products Corporation, Fairfax, Va.

[21] Appl. No.: 915,867

[22] Filed: Jul. 20, 1992

Related U.S. Application Data

[63] Continuation of Ser. No. 693,250, Apr. 29, 1991, abandoned.

[51] Int. Cl.$^5$ .............................................. G07F 7/06
[52] U.S. Cl. .................................. 194/209; 194/212
[58] Field of Search ............... 194/205, 208, 209, 212, 194/213; 414/507; 100/902; 406/38, 39, 156

[56] References Cited

U.S. PATENT DOCUMENTS

| | | | |
|---|---|---|---|
| 4,179,018 | 12/1979 | Miller | 194/209 |
| 4,248,389 | 2/1981 | Thompson et al. | |
| 4,285,426 | 8/1981 | Cahill | |
| 4,324,325 | 4/1982 | Dewoolfson | |
| 4,345,679 | 8/1982 | DeWoolfson | |
| 4,402,391 | 9/1983 | Tuten et al. | 194/213 |
| 4,440,284 | 4/1984 | DeWoolfson | |
| 4,463,844 | 8/1984 | Huffman et al. | 194/213 |
| 4,469,212 | 9/1984 | DeWoolfson et al. | |
| 4,492,295 | 1/1985 | DeWoolfson | |
| 4,573,641 | 3/1986 | DeWoolfson et al. | |
| 4,576,289 | 3/1986 | Jarrett et al. | 194/213 X |
| 4,579,216 | 4/1986 | DeWoolfson et al. | |
| 4,597,487 | 7/1986 | Crosby et al. | 194/213 X |
| 4,653,627 | 3/1987 | Hampson et al. | 194/209 |
| 4,687,144 | 8/1987 | Irwin et al. | |
| 4,784,251 | 11/1988 | DeWoolfson et al. | |
| 4,787,495 | 11/1988 | Tuten et al. | 194/209 |
| 4,919,534 | 4/1990 | Reed | |
| 4,923,126 | 5/1990 | Lodovico et al. | |
| 5,028,870 | 7/1991 | Reed | |
| 5,068,835 | 11/1991 | Reed | |

FOREIGN PATENT DOCUMENTS

| | | | |
|---|---|---|---|
| 0082735 | 6/1983 | European Pat. Off. | |
| 1947729 | 4/1971 | Fed. Rep. of Germany | |
| 3502465 | 7/1986 | France | 414/507 |
| WO88/07244 | 9/1988 | PCT Int'l Appl. | |

OTHER PUBLICATIONS

Hamilton, Martha, "Turning Cans Into Cold Cash", *The Washington Post*, Jul. 2, 1991.

*Primary Examiner*—Michael S. Huppert
*Assistant Examiner*—William M. Hienz
*Attorney, Agent, or Firm*—Finnegan, Henderson, Farabow, Garrett & Dunner

[57] ABSTRACT

A multiple use commodity collection and storage system, comprises a plurality of collection stations remotely located, each for receiving a plurality of different predetermined post-consumer recyclable commodities. Each station includes a consumer selectable insert port for receiving each different predetermined type of commodity; a pre-selection mechanism associated with each insert port for automatically verifying that an inserted commodity is of the predetermined type; a microprocessor for storing data corresponding to the commodities verified by the pre-selection mechanism; a device for densifying the commodities received in each insert port and verified by the pre-selection mechanism to be of the predetermined type; a bulk storage device including a segregated storage area for separately storing each predetermined type of densified commodity; a transfer device for automatically transferring each predetermined type of densified commodity from the densifying device to the corresponding segregated storage area in the bulk storage device and continuously maintaining the segregation of the commodity types during the transfer; and a dispenser for issuing at least one token in response to the receipt of a predetermined commodity. The system also includes at least one commodity collection vehicle including a transport compartment, and a mechanism for automatically loading at least one of the densified commodities into the transport compartment.

24 Claims, 16 Drawing Sheets

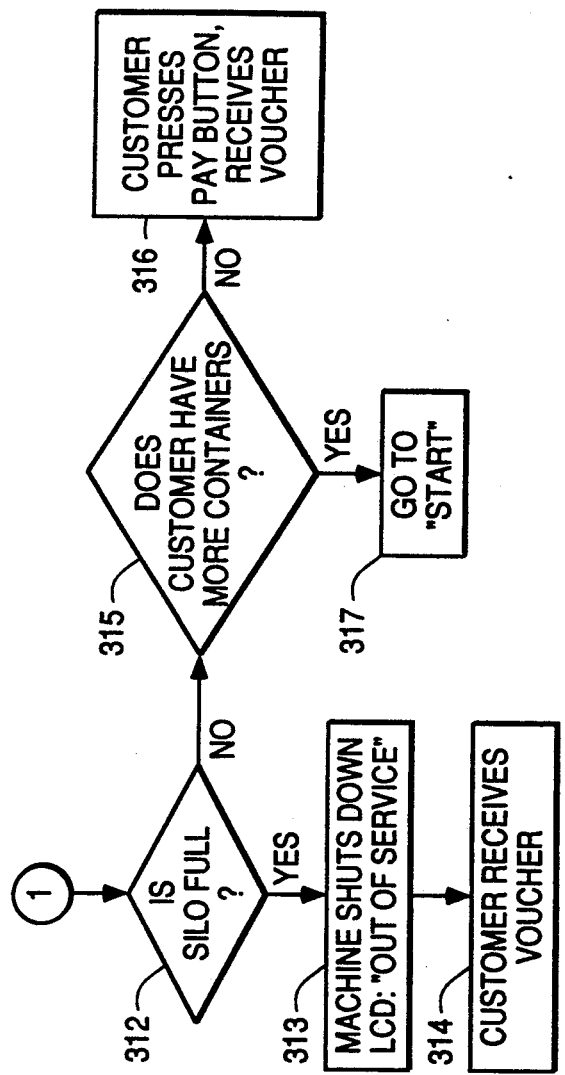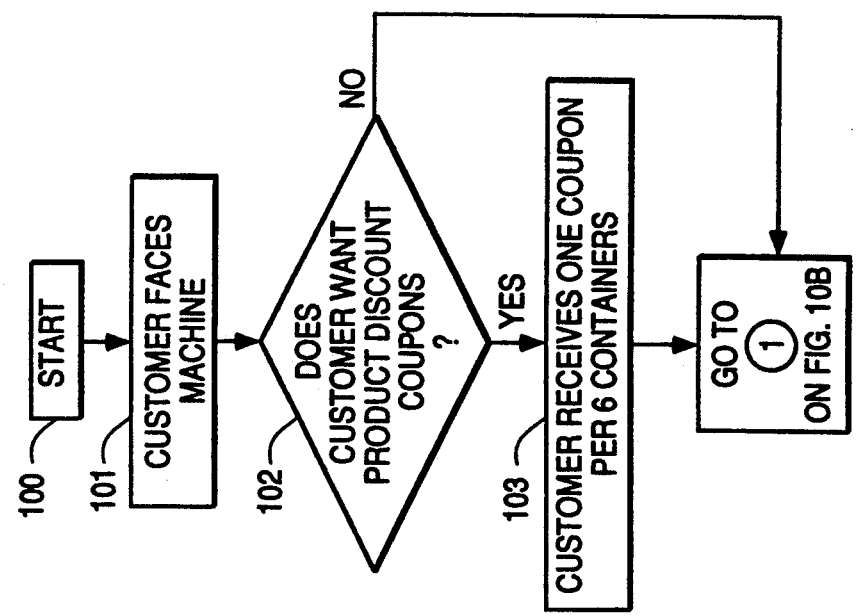

MULTIPLE USE COMMODITY COLLECTION AND STORAGE SYSTEM

This application is a continuation of application Ser. No. 07/693,250, filed Apr. 29, 1991, now abandoned.

FIELD OF THE INVENTION

This invention relates to the collection and storage of recyclable commodities, and more particularly to systems for collecting, densifying and storing used beverage containers of various types.

BACKGROUND OF THE INVENTION

In recent years, with increasing emphasis on energy conservation, the recycling of used beverage containers and other similar commodities has become an important factor in the conservation effort. More specifically, the recycling of aluminum, glass and plastic containers has proven to be energy efficient, and environmentally beneficial.

In addition, numerous jurisdictions have enacted mandatory deposit laws which require deposits on all beverage containers. Such laws create additional problems for the grocery industry, and burdens for those tasked with collecting the containers, paying the refunds, and storing the returned commodities. A number of machines have been developed in the prior art for encouraging the recovery and recycling of beverage containers. For example, Applicant's assignee is the owner of U.S. Pat. Nos. 4,440,284; 4,573,641; 4,492,295; and 4,784,251. All of these patents relate to machines and systems for automated redemption of used beverage containers. While much progress has been made in the development of efficient systems for encouraging and effecting recycling of containers, a number of problems still remain in the prior art. In particular, in those areas where reverse vending machines are used to collect and store such containers, retail store operators typically must remove the crushed or densified commodities from the machine and store them for later pickup. This creates storage problems for the retailer and uses up otherwise valuable retail or storage space.

In addition, in some jurisdictions, retailers are obligated to accept returned containers. Thus, if a reverse vending machine is inoperable, repairs must be made rapidly in order to avoid disruption of the retailer's operation to manually sort and store containers.

Another problem experienced with prior art systems is the requirement for the retailer or other service agency to frequently add money to machines which pay deposit refunds or other monetary compensation for returned containers.

Accordingly it is an object of the present invention to efficiently collect, densify and store large quantities of post consumer recyclable commodities with a minimum of service requirements.

It is a further object of the present invention to reduce the burdens of maintaining adequate supplies of coins or currency in the collection stations of a commodity collection and storage system.

It is an additional object of the present invention to reduce the incidence of break-in of the collection stations of a commodity collection and storage system by utilizing an alternative to currency or coins.

A further object of the invention is to provide a commodity collection and storage system in which the collection stations can automatically indicate when repairs are needed to a central control facility.

Additional objects and advantages of the invention will be apparent from the description which follows, or may be learned by practice of the invention.

SUMMARY OF THE INVENTION

To achieve the foregoing objects and advantages, and in accordance with the purposes of the invention as embodied and broadly described herein, the multiple use commodity collection and storage system of the present invention comprises a plurality of remotely located collection stations, each for receiving a plurality of different predetermined post-consumer recyclable commodities. Each station includes a consumer selectable insert port for receiving each different predetermined type or types of commodity; pre-selection means associated with each insert port for automatically verifying that an inserted commodity is of the predetermined type; microprocessor means for storing data corresponding to the commodities verified by the pre-selection means; means for densifying the commodities received in each insert port and verified by the pre-selection means to be of the predetermined type; bulk storage means including a segregated storage area for separately storing each predetermined type of densified commodity; transfer means for automatically transferring each predetermined type of densified commodity from the densifying means to the corresponding segregated storage area in the bulk storage means and continuously maintaining the segregation of the commodity types during the transfer; and means for issuing at least one token in response to the insertion of a commodity of the predetermined type.

The system also includes a plurality of commodity collection vehicles, each vehicle including a transport compartment and means for automatically loading the densified commodity of at least one of the predetermined types from the bulk storage means into the transport compartment. It is preferred that the transport compartment of each vehicle include a plurality of separate segregated zones, each for receiving a different densified commodity from the bulk storage means.

Preferably, the transfer means includes either mechanical or pneumatic means for conveying the densified commodities from the densifying means to the bulk storage means. It is also preferred that the system include means for remotely accessing the microprocessor means of each station for centrally reading the data. The microprocessor means may also store data on the repair state of the particular station, and this data may also be read by the remotely accessing means. The remotely accessing means typically includes a central processing unit for analyzing the data from the plurality of stations, and routing the commodity collection vehicles, or repair personnel to the stations on the basis of the data.

Each of the commodity collection vehicles preferably includes vacuum suction means for transferring each densified commodity from the bulk storage means to the corresponding segregated zone in the vehicle.

It is preferred that the token issued by the token issuing means comprise a redeemable voucher, or coupon. Alternatively, the token could include coins or currency. Each station preferably includes coupon printing means for printing and issuing redeemable coupons in response to commodities received and verified by the pre-selection means.

It is preferred that each station include a plurality of reverse vending machines, an insert port being located in each machine, and the bulk storage means includes at least one storage bin corresponding to each machine, each bin being remotely positioned in relation to the machine for receiving commodities from the machine while maintaining the size of the machine within predetermined limits. Alternatively, the densified commodities may be transferred to a prestorage means including a separate space for each predetermined type of commodity, and later transferred to the bulk storage means.

It is preferred that the different commodities include aluminum, glass, and polymer resin. The glass may include green, brown and white glass, and each station may include means for segregating the glass into separate storage bins for receiving the green, brown and white glass, respectively.

BRIEF DESCRIPTION OF THE DRAWINGS

The accompanying drawings, which are incorporated in and constitute a part of the specification, illustrate the presently preferred embodiments of the invention and, together with the description, serve to explain the principles of the invention.

FIGS. 10A and 10B are operational flow charts of the can collection machine used with the system of the invention;

FIGS. 12A and 12B are operational flow charts of the plastic collection machine used in the system of the invention;

DESCRIPTION OF THE PREFERRED EMBODIMENTS

Reference will now be made in detail to the present preferred embodiments of the invention, as illustrated in the accompanying drawings.

The present invention is a multiple use commodity collection and storage system. In accordance with the invention, the system comprises a plurality of remotely located collection stations, each for receiving a plurality different predetermined post consumer recyclable commodities. In accordance with the invention, each station includes a consumer selectable insert port for receiving each different predetermined type of commodity, pre-selection means associated with each insert port for automatically verifying that an inserted commodity is of the predetermined type; microprocessor means for storing data corresponding to the commodities verified by the pre-selection means; means for densifying the commodities received in each insert port and verified by the pre-selection means to be of the predetermined type; bulk storage means including a segregated storage area for separately storing each predetermined type of densified commodity; transfer means for automatically transferring each predetermined type of densified commodity from the densifying means to the corresponding segregated storage area in the bulk storage means and continuously maintaining the segregation of the commodity types during the transfer; and means for issuing at least one token in response to the receipt of a predetermined commodity.

Figure 1:
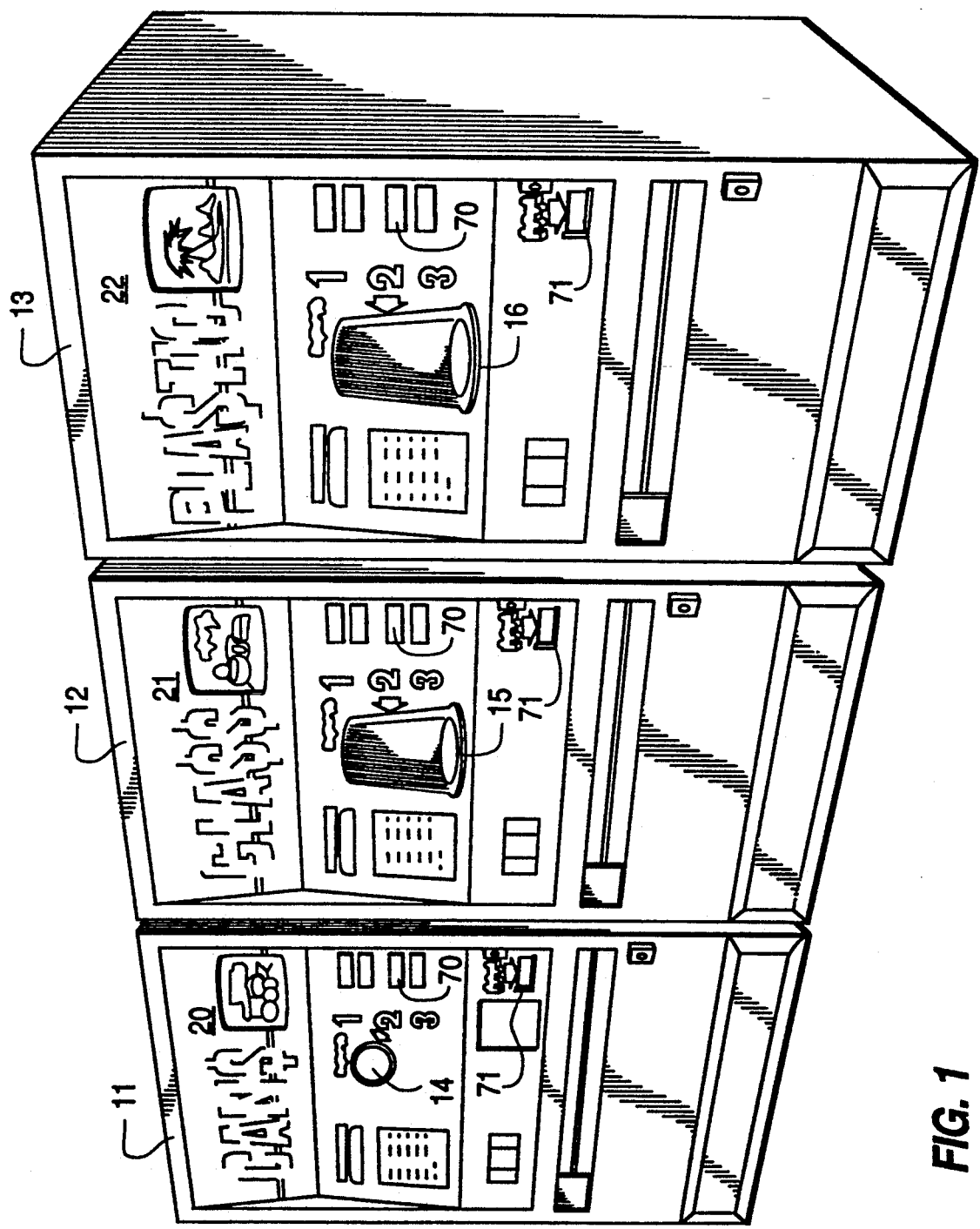
FIG. 1 is a perspective view of a typical collection station of the multiple used commodity collection and storage system of the present invention, showing separate reverse vending for cans, glass containers and plastic containers.
Figure 2:
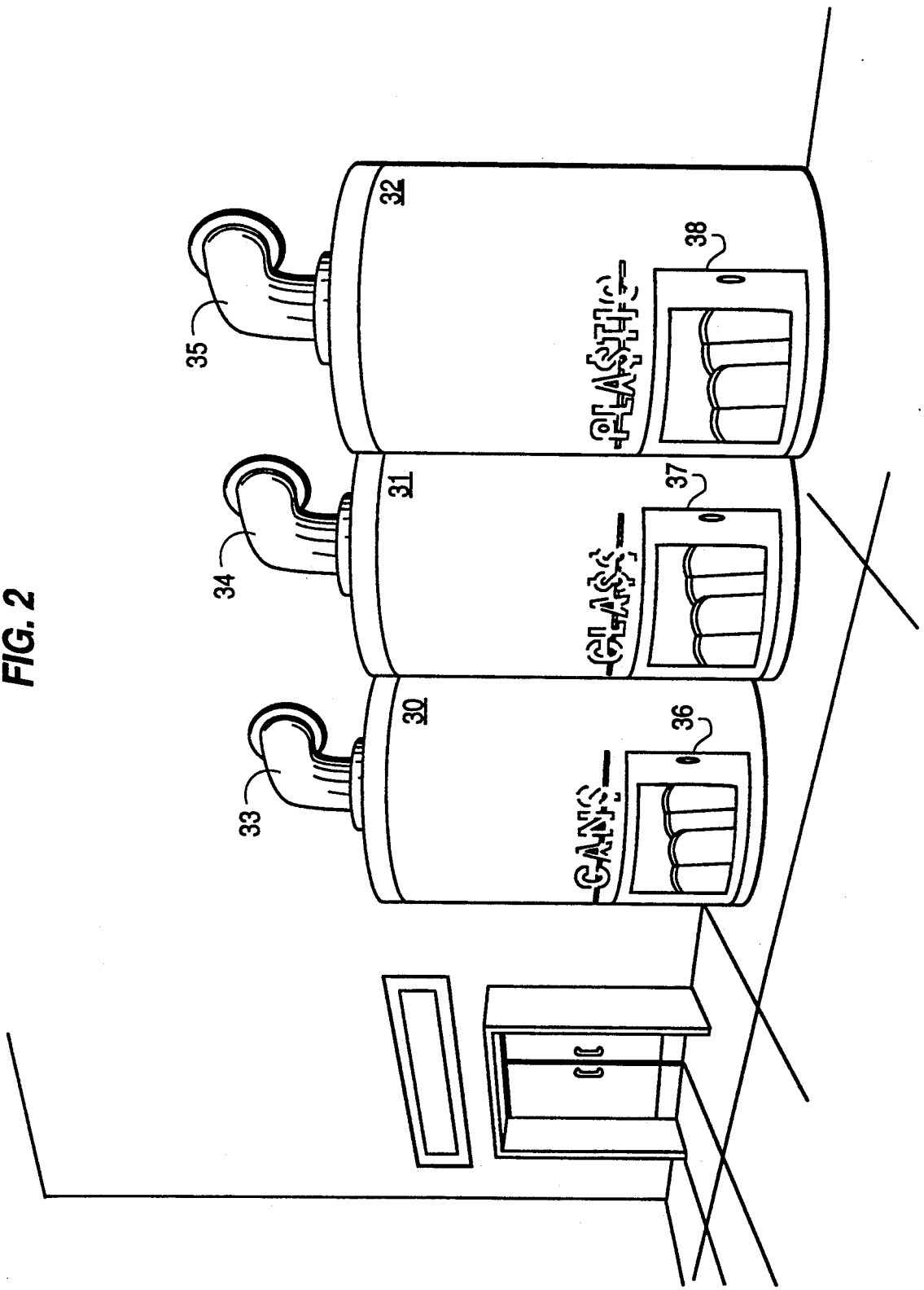
FIG. 2 is a perspective view of the bulk storage means of one station of the present invention showing the separate storage bin corresponding to each of the reverse vending machines in FIG. 1.

As shown in FIGS. 1 and 2, each station generally includes a plurality of reverse vending machines 11, 12 and 13. Each machine includes a consumer selectable insert port 14, 15 and 16. Each of these ports receives a different predetermined type or types of commodity. In the illustrated embodiment, port 14 is arranged for receiving aluminum cans, port 15 receives glass containers, and port 16 is configured for receiving plastic or polymer resin containers. The polymer resin may include, for example, high density polyethylene, polypropylene, polyvinyl chloride, or polyethylene terephthalate (PET).

Each of the machines, 11, 12 and 13, includes a front panel 20, 21 and 22, with instructions and activation switches for use of the machine. The operation of such machines is described in prior patents of applicant's assignee, including U.S. Pat. Nos. 4,784,251; 4,492,295; 4,573,641; 4,440,284; 4,345,679; 4,324,325; 4,469,212; 4,919,534 and 4,579,216 FIGS. 10A and B, 11A and B, and 12A and B illustrate in flow chart form, the operation of each of the can, glass and plastic collection machines, respectively, typically used with the system of the invention. These charts are described more fully below.

As shown in FIG. 1, the insert port of each machine is configured to receive the particular predetermined commodity or commodities associated with that machine.

Within each machine 11, 12 and 13, and associated with each of the insert ports 14, 15, and 16, is pre-selection means for automatically verifying that an inserted commodity is of the predetermined type. Various alternatives for the pre-selection means are disclosed in the patents of applicant's assignee, incorporated by reference above. For example, an acoustic sensor, as disclosed in U.S. Pat. No. 4,784,251, the description of which is incorporated herein by reference, may be provided to sense a container, and a laser scanning mechanism may be provided to scan indicia such as a bar code on a label of the container. A light source assembly, as disclosed in U.S. Pat. No. 4,919,534, the description of which is incorporated herein by reference, may be utilized to pass a light beam through the container to analyze the character of light transmitted through the container utilizing the intensity measured by first and second light analyzers. U.S. patent application Ser. No. 07/584,507, now U.S. Pat. No. 5,068,035, owned by applicant's assignee, describes an acoustic holographic array measurement device, which may be used for identifying containers the description of which is also incorporated herein by reference.

After the inserted commodity is verified as being of the predetermined type to be accepted by that particular machine, the commodity is accepted by the machine and transferred to a densifying means within the machine. For example, the shredding means disclosed in U.S. patent application Ser. No. 07/645,926 filed Jan. 25, 1991, and owned by applicant's assignee, the description of which is incorporated herein by reference, may be utilized. Other densifying mechanisms may be utilized, such as crushers and comminuting devices similar to those disclosed in U.S. Pat. Nos. 4,573,641 and 4,784,251, the descriptions of which are incorporated by reference herein.

As shown in FIG. 2, the bulk storage means includes a segregated storage area for separately storing each predetermined type of densified commodity. In the embodiment illustrated in FIG. 2, three storage bins 30, 31 and 32, are connected to the machines 11, 12 and 13, respectively, by enclosed conduits 33, 34 and 35. As illustrated, the bins 30, 31 and 32 correspond to the commodities, cans, glass and plastic. Each of the storage bins 30, 31 and 32 includes an access opening 36, 37 and 38 for removing densified commodities from the storage bins.

Figure 5:
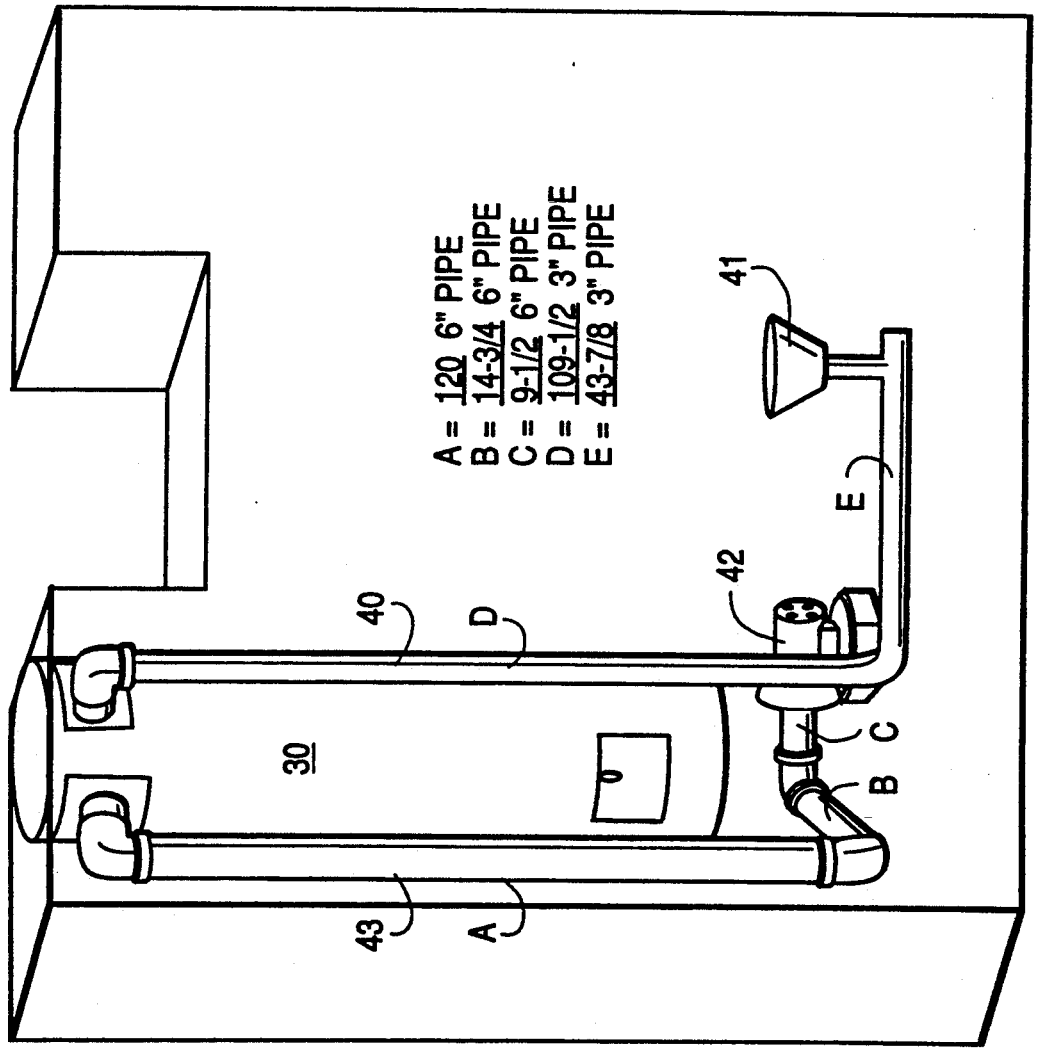
FIG. 5 is a perspective view of an embodiment of the bulk storage means and transfer means of the present invention particularly for use with cans.

As shown in FIGS. 5, 6, 7 and 8, the transfer means of the present invention may include pneumatic means for conveying the densified commodities from the densifying means to the bulk storage means. In the illustrated embodiment of FIG. 5, a transfer means and bulk storage bin for receiving densified cans is shown. In FIG. 5, the bulk storage bin 30 is connected to an intake pipe 40 which leads to a hopper 41 disposed for receiving the densified cans from the densifying means. A blower 42 draws air and densified or shredded cans through the hopper 41 and the inlet pipe 40 into the bin 30. An outlet tube 43 leads to the blower 42 for creating the suction effect. Based on the weight of the densified commodity, a one-horse power blower may be used. The inlet pipe 40 is approximately three inches in diameter, and the outlet pipe 43 is four to six inches.

Figure 6:
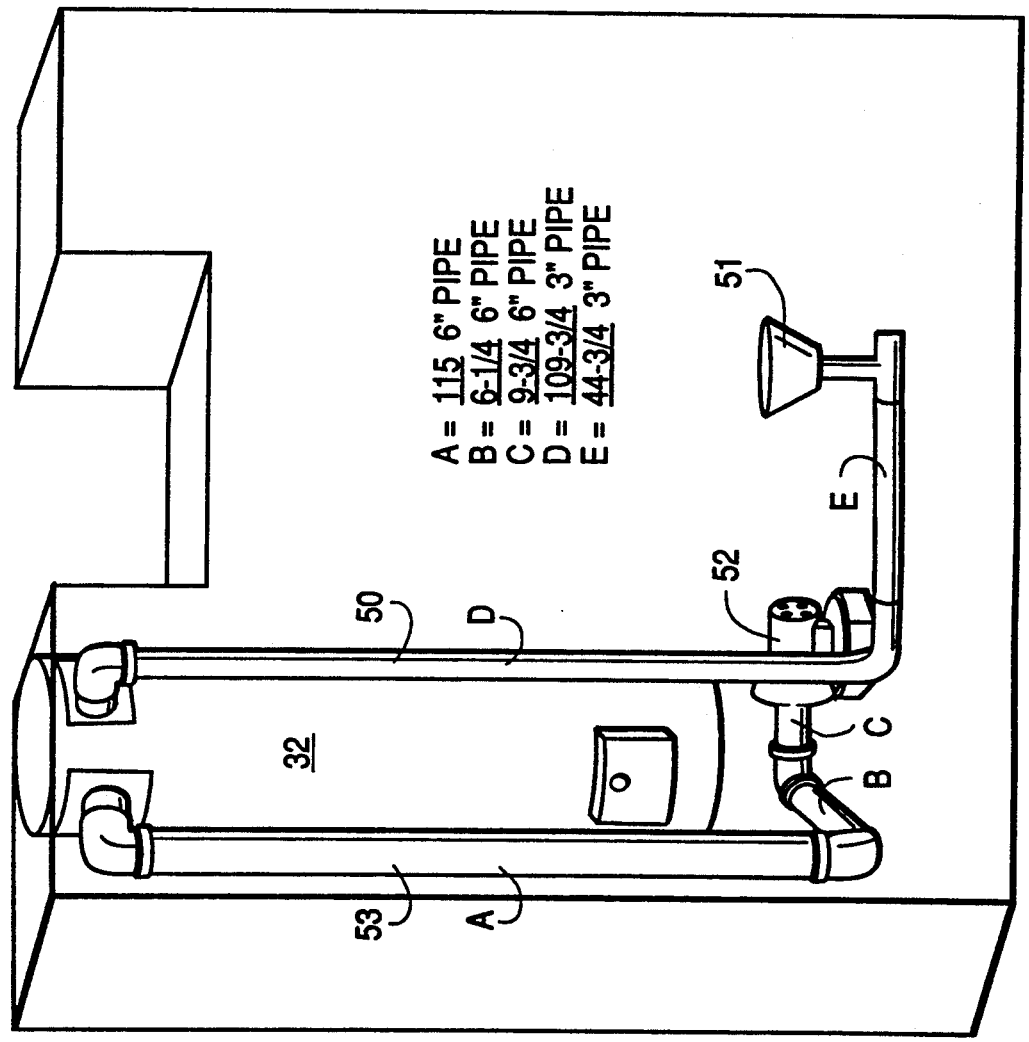
FIG. 6 is a perspective view of the bulk storage means for use with polymer resins or plastic containers and the associated means.

FIG. 6 illustrates a similar arrangement to FIG. 5 for use in connection with plastic containers. In this arrangement, the storage bin 32 is also connected to a three inch diameter inlet pipe 50 leading to a hopper 51 for receiving the densified or shredded plastic. The hopper 51 is disposed for receiving the densified plastic from the densifying means of the plastic machine 13. A blower 52 draws air and densified plastic through the hopper 51 and the inlet pipe 50 into the bin 32. The air continues through the outlet pipe 53 back to the blower 52. In this embodiment, a one horse power blower may also be used in conjunction with a four to six inch outlet pipe and three inch inlet pipe.

Figure 7:
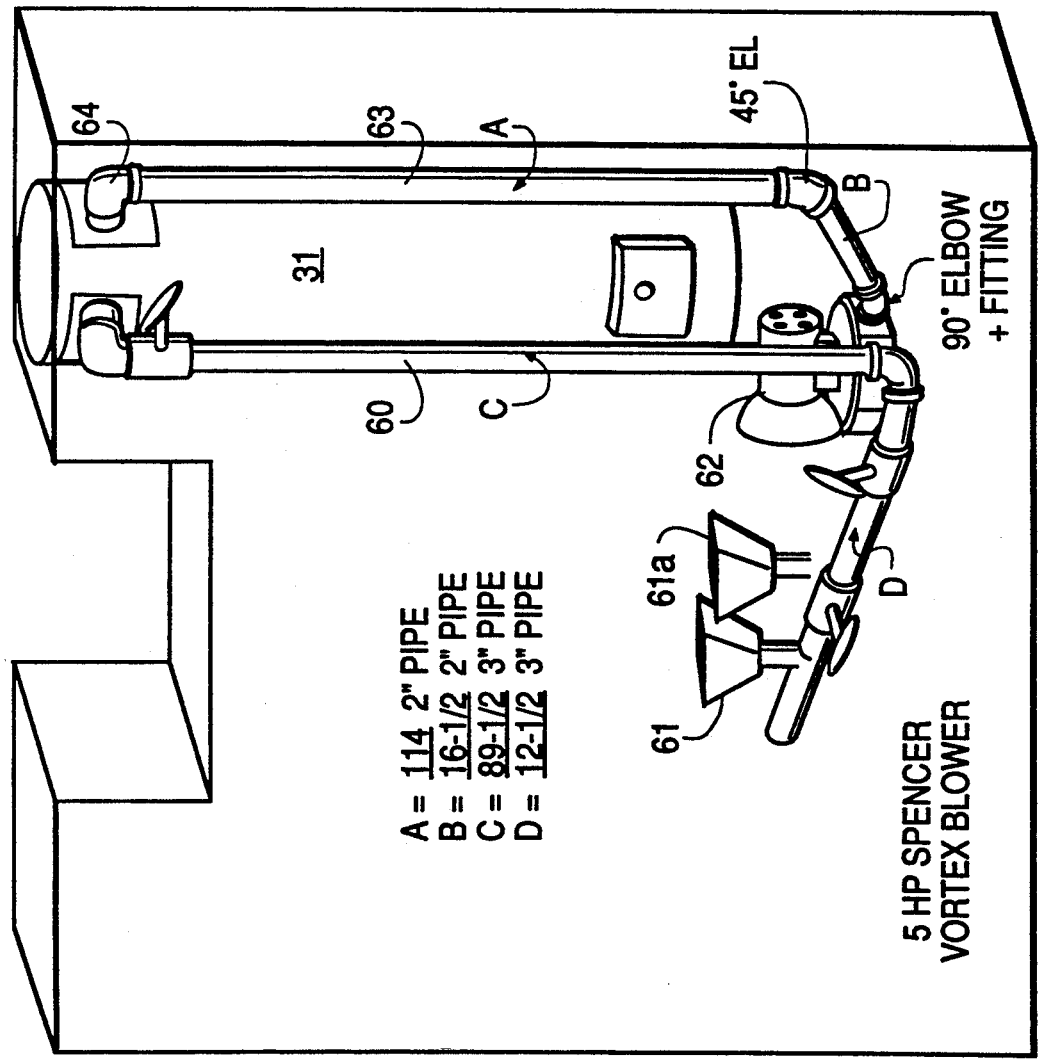
FIG. 7 is a perspective view of the bulk storage bin and associated pneumatic transfer means for use with the glass recycling machine for removing and storing clear glass.
Figure 8:
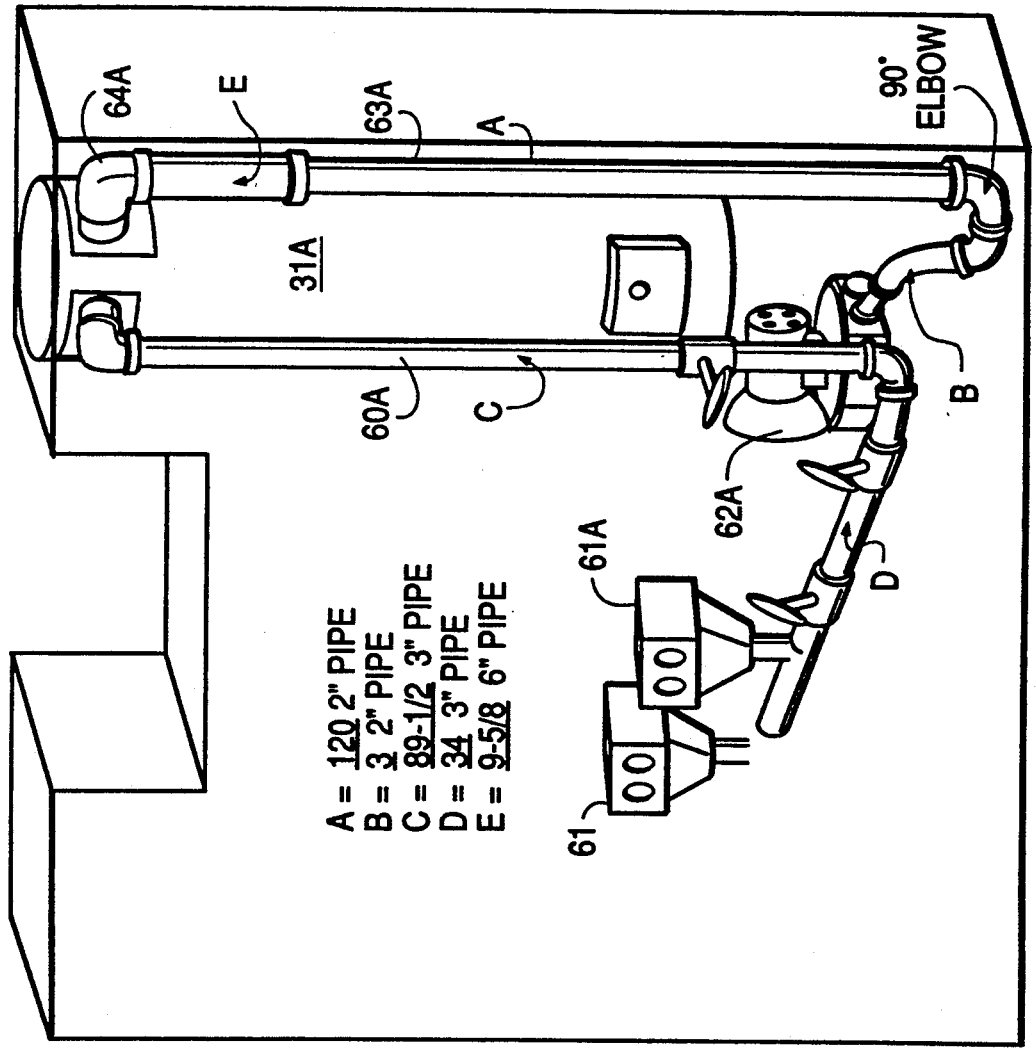
FIG. 8 is a perspective view of a storage bin and associated transfer means for transferring and storing colored glass from the glass recycling machine.

FIGS. 7 and 8 are similar illustrations of transfer mechanisms for use in connection with the glass machine. FIGS. 7 and 8 illustrate the use of two storage bins, one for receiving clear glass, and one for receiving colored glass. In FIG. 7, the storage bin 31 is connected to an inlet pipe 60 with a hopper 61 on the end thereof. The hopper 61 is positioned for receiving clear glass from the densifying means of the machine 12. A blower 62 draws air and glass particles through the hopper 61 and the inlet pipe 60 into the storage bin 31. The air then exits the storage bin through the outlet pipe 63 to the blower 62. A second hopper 61A is illustrated which receives the colored glass, as shown in FIG. 8. In the case of the glass particles, the inlet pipe is a three inch pipe, and the outlet pipe is approximately two inches in diameter. However, a six inch elbow 64 is also utilized at the air exit from the bin 31.

As shown in FIG. 8, the colored glass is carried to a second storage bin 31A by a separate blower 62A through the hopper 61A and the inlet pipe 60A. The air exits the storage bin 31A through an outlet pipe 63A. In this case, a three inch inlet pipe and a two inch outlet pipe are used. Because of the heavier nature of the glass particles, a five horse power Spencer Vortex blower is used with the arrangements shown in FIGS. 7 and 8.

Figure 14:
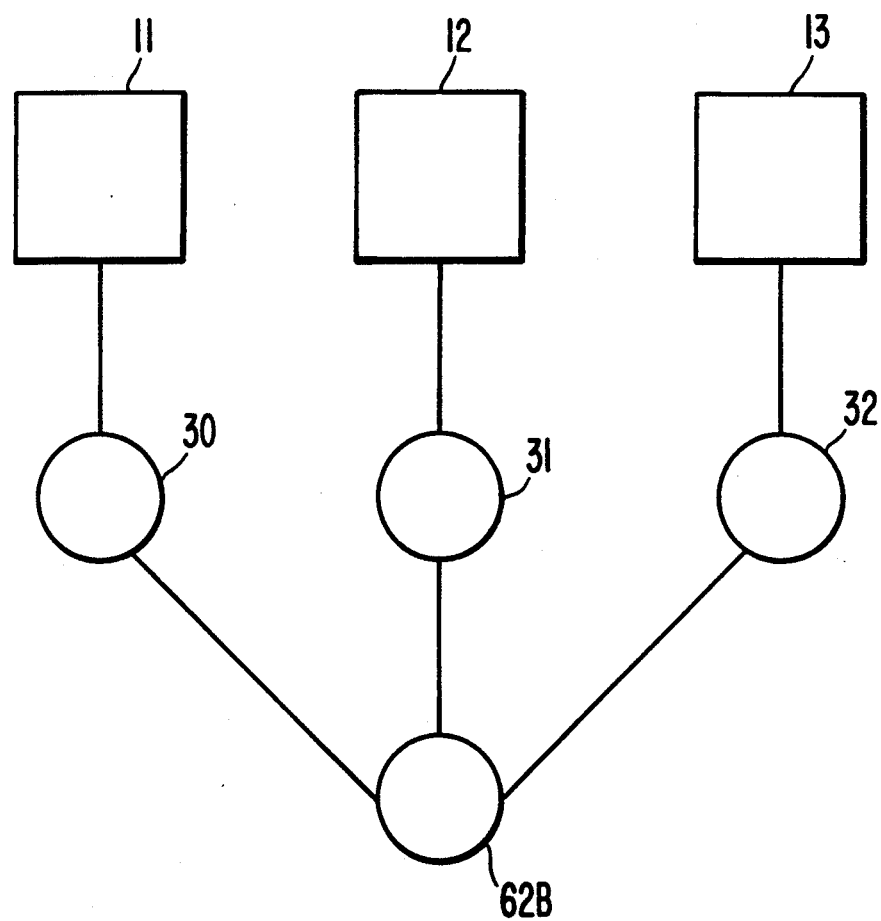
FIG. 14 is a block diagram schematically showing one configuration of suction means used with the system of the present invention.

As shown in FIG. 14, if desired, a single, more powerful blower 62B may be used, with microprocessor controlled valves (not shown) being arranged so that each different densified commodity may be transferred to the bulk storage bins 30, 31, 32 by the suction of the single blower. This arrangement saves space, expense, and unnecessary power consumption.

Each of the reverse vending machines 11, 12 and 13 includes a means for issuing at least one token in response to the receipt of a predetermined commodity. For example, a push button on the front panel of each machine may be used to activate a coin dispenser, token dispenser, or coupon printer installed within the machine. Examples of such dispensers are described and illustrated in the patents of applicant's assignee, the descriptions of which are incorporated by reference herein. As shown in FIG. 1, a cash button 70 may be used to activate the dispenser and the token may be issued through the slot 71. In order to reduce the need for maintaining a supply of coins or currency in the machine, it is preferred that a coupon printing means be utilized for printing and issuing redeemable coupons or vouchers in response to the commodities received and verified by the pre-selection means. These coupons can be later exchanged for merchandise or cash, thereby eliminating the need for storing currency or coins in the machine. This in turn leads to less break-ins of the machines as it becomes known that nothing of value can be removed from the machine. Such coupon printing mechanisms are known in the art and may be readily incorporated in the machine by those skilled in the art.

Each of the machines 11, 12 and 13, includes a microprocessor for storing data corresponding to the commodities verified by the pre-selection means, as described in the patents of applicant's assignee, the description of which are incorporated by reference herein. For example, as described in U.S. Pat. No. 4,579,216, the description of which is incorporated herein by reference, the machine may include a mechanism for reading the universal product code from a particular container, or a means for acoustically determining the shape of the container to identify its source, as disclosed in U.S. patent application Ser. No. 07/584,507, now U.S. Pat. No. 5,068,835, owned by applicant's assignee, the description of which is also incorporated by reference herein. As described in the '216 patent, the microprocessor may communicate with a central processing unit in a central coordination facility to communicate data on the quantity and type of commodities collected. Based on this data, routing of vehicles to the particular stations in the system may be efficiently planned. In addition, each station may generate data indicating failure parameters in the machines and transmit that data to the central processing unit so that repair personnel may be efficiently dispatched. The remote access may be done automatically by telephone so that no manual operation is required to obtain the necessary data from the collection stations.

If desired, each of the machines 11, 12 and 13 may include prestorage means including a separate space for each predetermined type of commodity. For example, a limited size storage space may be provided in each machine, and the densified commodity may be periodically transferred to the bulk storage means if desired. The prestorage means may include a chamber in the lower portion of the reverse vending machines 11, 12 and 13 for receiving the densified commodities directly from the densifying means. In this arrangement, the prestorage means may comprise hoppers 41, 51, 61 and 61A arranged in a lower portion of the prestorage area. Transfer to the bulk storage bins 30, 31, 31A and 32 can be effected automatically at predetermined intervals, or when the prestorage area is filled to a predetermined capacity.

Figure 9:
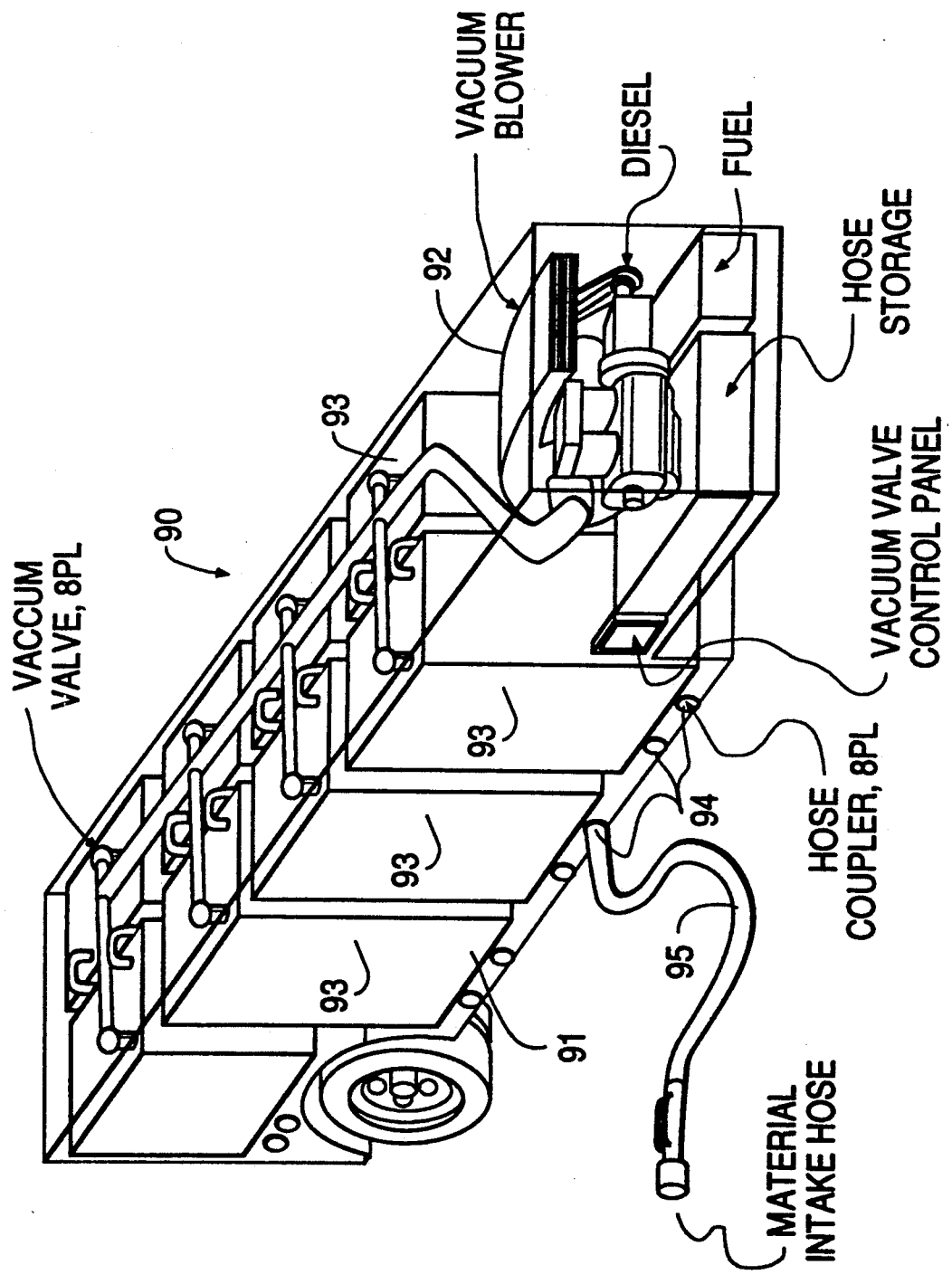
FIG. 9 is a perspective view of a commodity collection vehicle for use with the system of the invention.

The system of the present invention preferably includes a plurality of commodity collection vehicles, each vehicle including a transport compartment and means for automatically loading the densified commodity of at least one of the predetermined types from the bulk storage means into the transport compartment. As embodied herein, and as illustrated in FIG. 9, each commodity collection vehicle is a truck or trailer 90 having a transport compartment 91 thereon. A vacuum suction apparatus 92 may be provided on the truck or trailer 90 for automatically transferring the densified commodity from the storage bin 30, 31, 31A, 32 to the vehicle 90. A plurality of separate segregated zones 93 may be provided in the vehicle 90 for receiving each different densified commodity. In addition, hose couplings 94 into and out of each compartment, may be used for rapid attachment and detachment of the hose 95.

Figure 3:
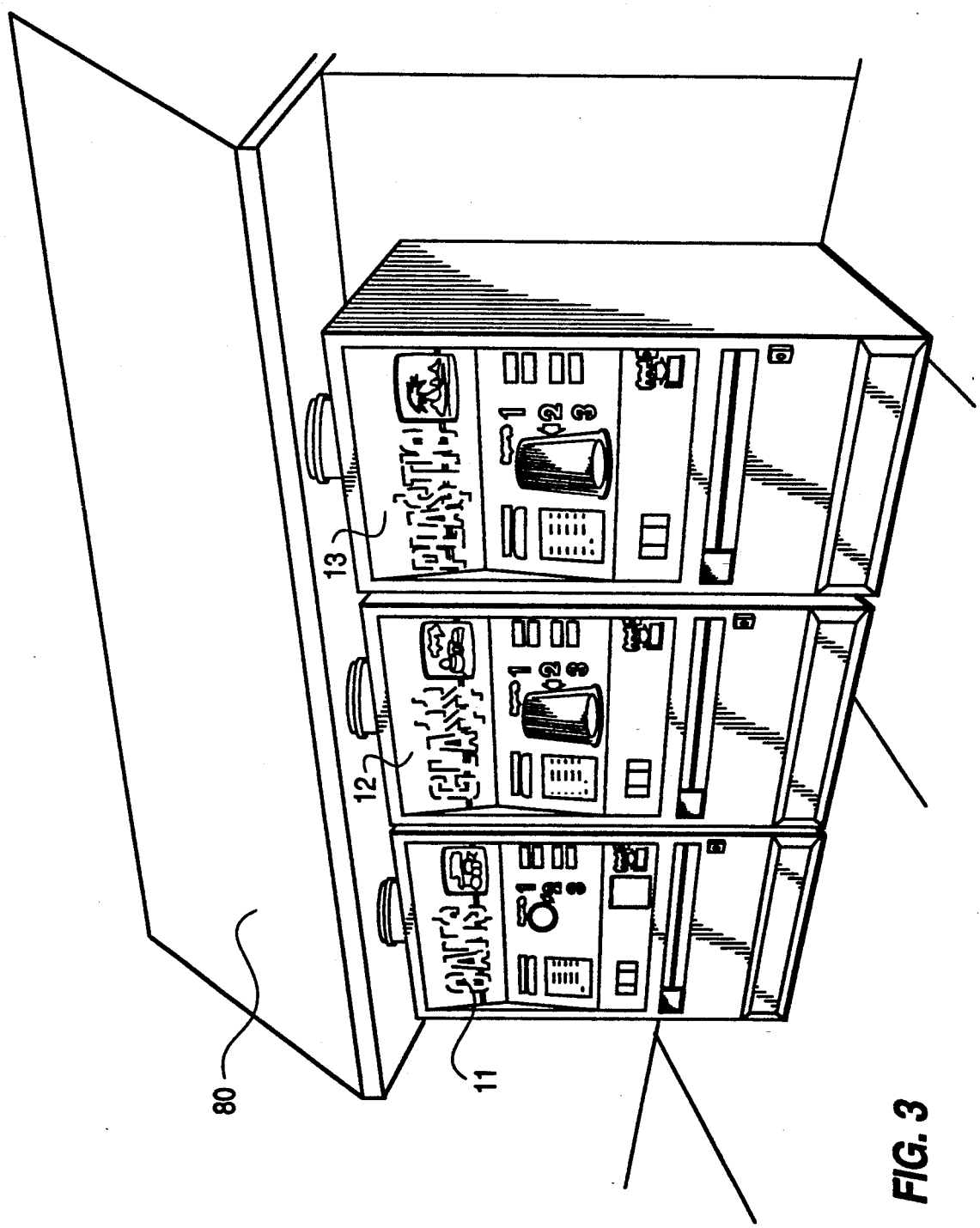
FIG. 3 is a perspective view, similar to FIG. 1, showing the reverse vending machines of one collection station configured for outdoor use.
Figure 4:
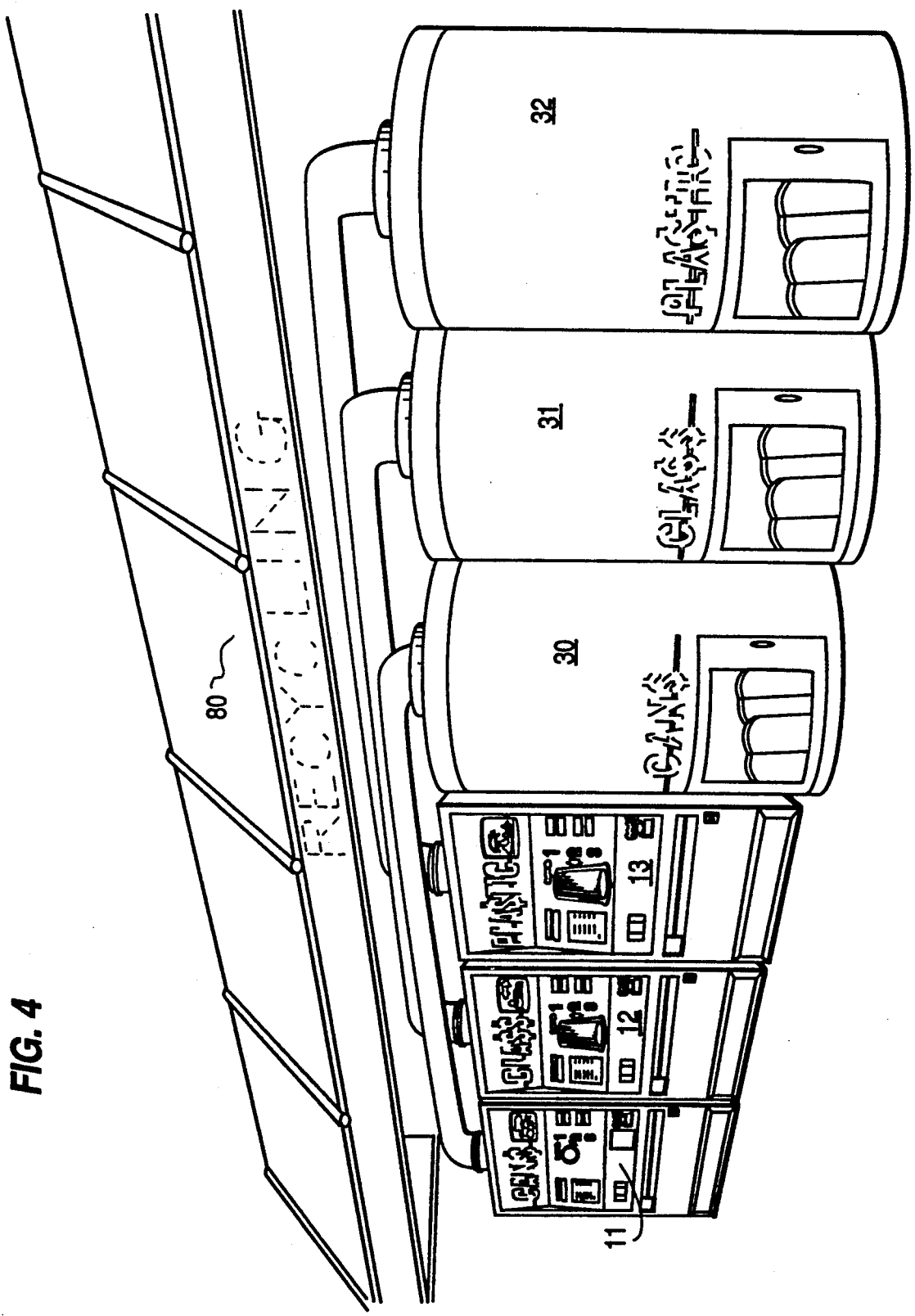
FIG. 4 is a perspective view of another embodiment of the present invention with the bulk storage bins aligned contiguous to the reverse vending machines.

Further configurations for the stations are shown in FIGS. 3 and 4. FIG. 3 depicts the machines 11, 12, and 13 in a outdoor storage environment, beneath a suitable awning or roof 80. In FIG. 4, the storage bins 30, 31 and 32 are arranged side-by-side with the reverse vending machines 11, 12 and 13. In FIG. 4, an awning or roof 80 is also provided.

Figure 10B:
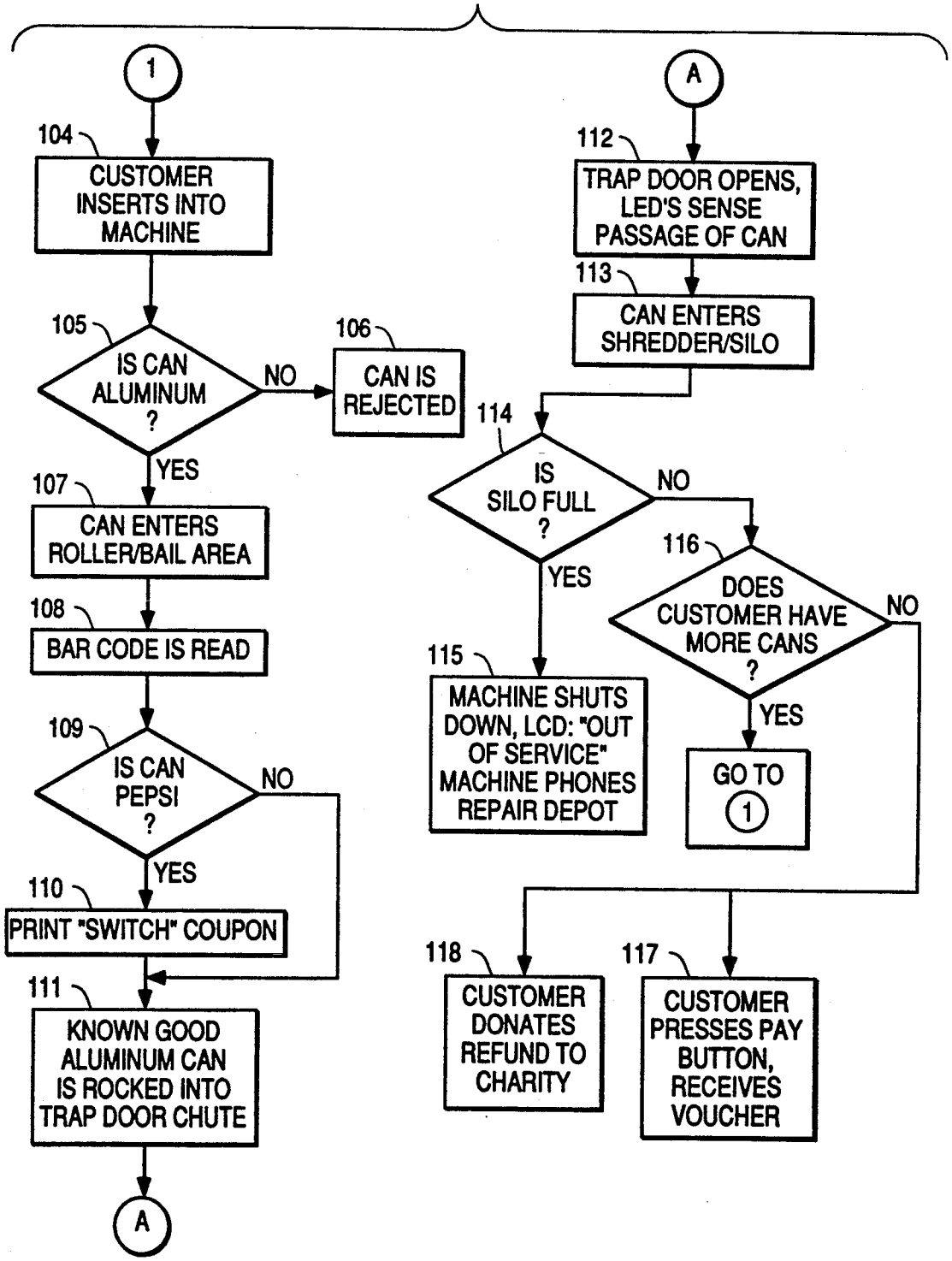

As shown in FIGS. 10A, B through 12A, B, the reverse vending machines 11, 12, and 13, generally operate according to the flow charts illustrated. In the case of the can collection machine, the customer initiates the operation by facing the machine at block 101, and selecting whether product coupons are desired (102). If coupons are chosen, one coupon will be issued by the machine for each six cans received by the machine (103). The consumer then inserts the can into the machine (104), and the pre-selection means determines whether the can is aluminum (105). If the can is not aluminum, it is rejected (106), and the consumer must insert another can to continue. When an aluminum can is present, the machine reads the bar code on the can (107, 108). Thereafter, additional messages can be optionally printed for particular manufacturers, if desired (109, 110). When the can has been determined as acceptable, it is fed to the can shredder for densifying and transfer to the storage bin 30 (111, 112, 113). If the storage bin 30 is full, the machine shuts down and an error message appears (114, 115). If the shredded can is properly transferred to the bulk storage bin 30, and the bin is not full, the customer may insert the next can into the insert port 14 (116). In this case, the operation starts again at block 104. When the customer has finished inserting all cans, a decision can be made to donate the proceeds (value or deposit refunds) to charity (118), or to receive a voucher for subsequent payment in cash (117).

Figure 11A:
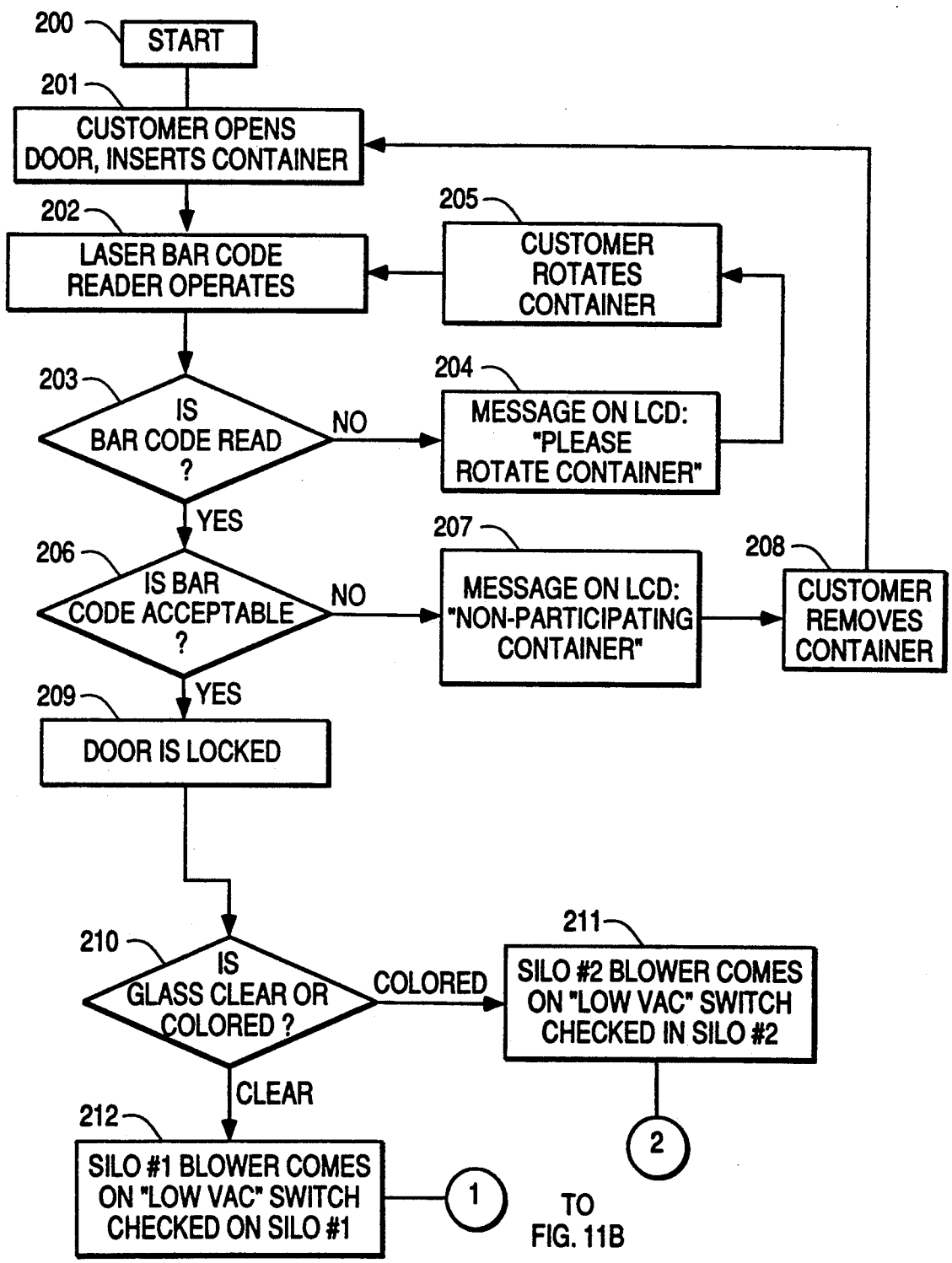
FIGS. 11A and 11B are operational flow charts of the glass collection machine used in the system of the present invention.
Figure 11B:
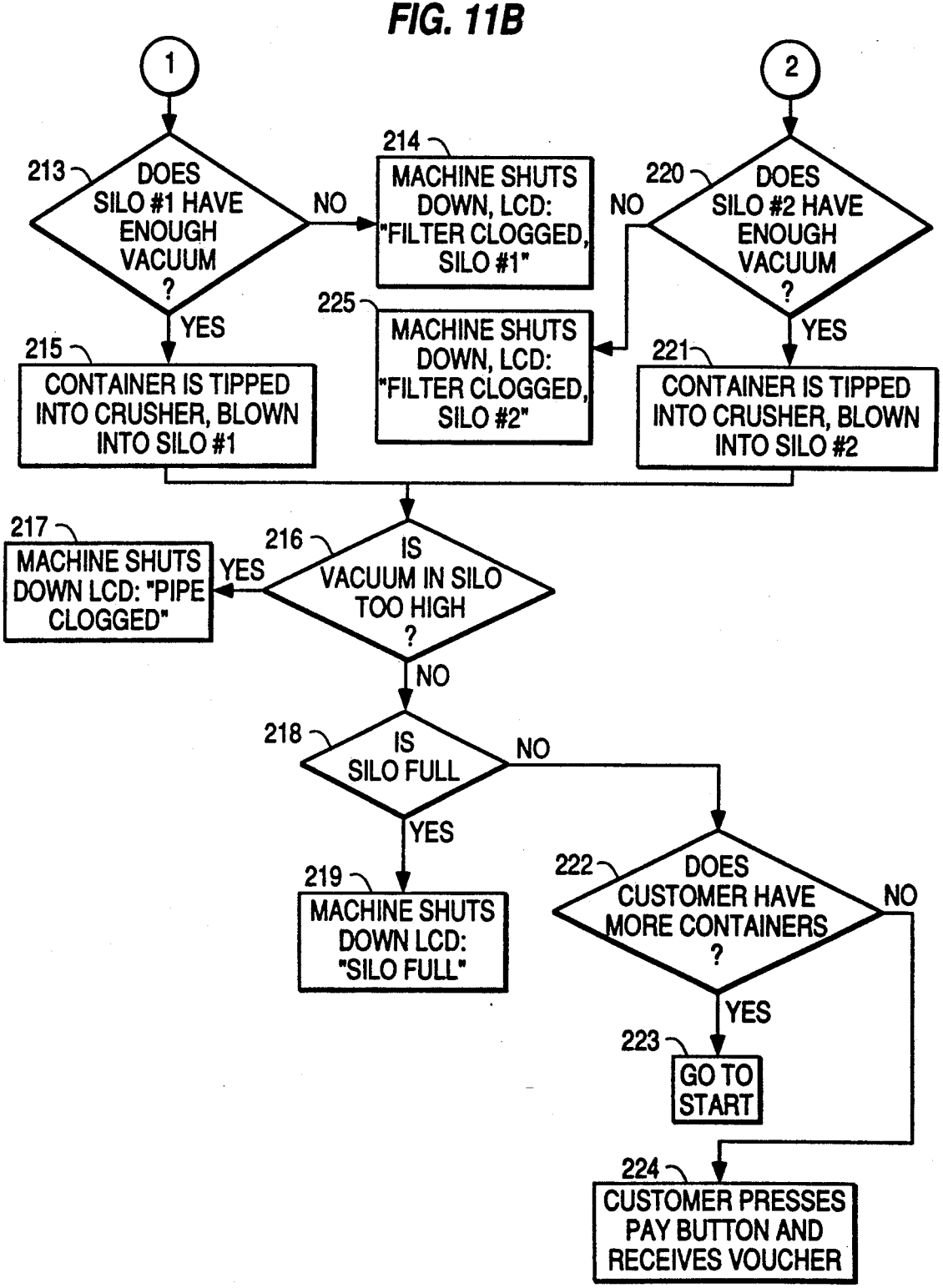

In the case of the glass collection machine, the operation is substantially similar, as shown in FIGS. 11A and 11B. However, the glass machine has a protective door (201), and the customer may be required to rotate the container to allow for proper reading of the bar code label (202, 203, 204, 205). Another optional routine is shown in FIG. 11A regarding the acceptability of the container as a "participating" vendor (207, 208). Once the door is locked (209), the machine determines whether the glass is colored or clear (210). This determines which blower or valve will activate to transfer the crushed glass to the proper storage bin (211, 212). Also, a determination is made by appropriate sensors whether the receiving bin has enough vacuum (213, 220). An error message appears if the vacuum is too low (214, 225). If the storage bin has sufficient vacuum, the bottle is crushed (215, 221) and blown into the appropriate storage bin 31, 31A. However, there is an additional check on the vacuum in the storage bin (216) to determine if it is too high. If so, the machine shuts down (217). If the vacuum is acceptable, and the storage bin is not full (218), the customer may insert another container (222, 223), or request a payment voucher (224). If the storage bin is full (219), the machine stops and a "full" message appears.

Figure 12A:
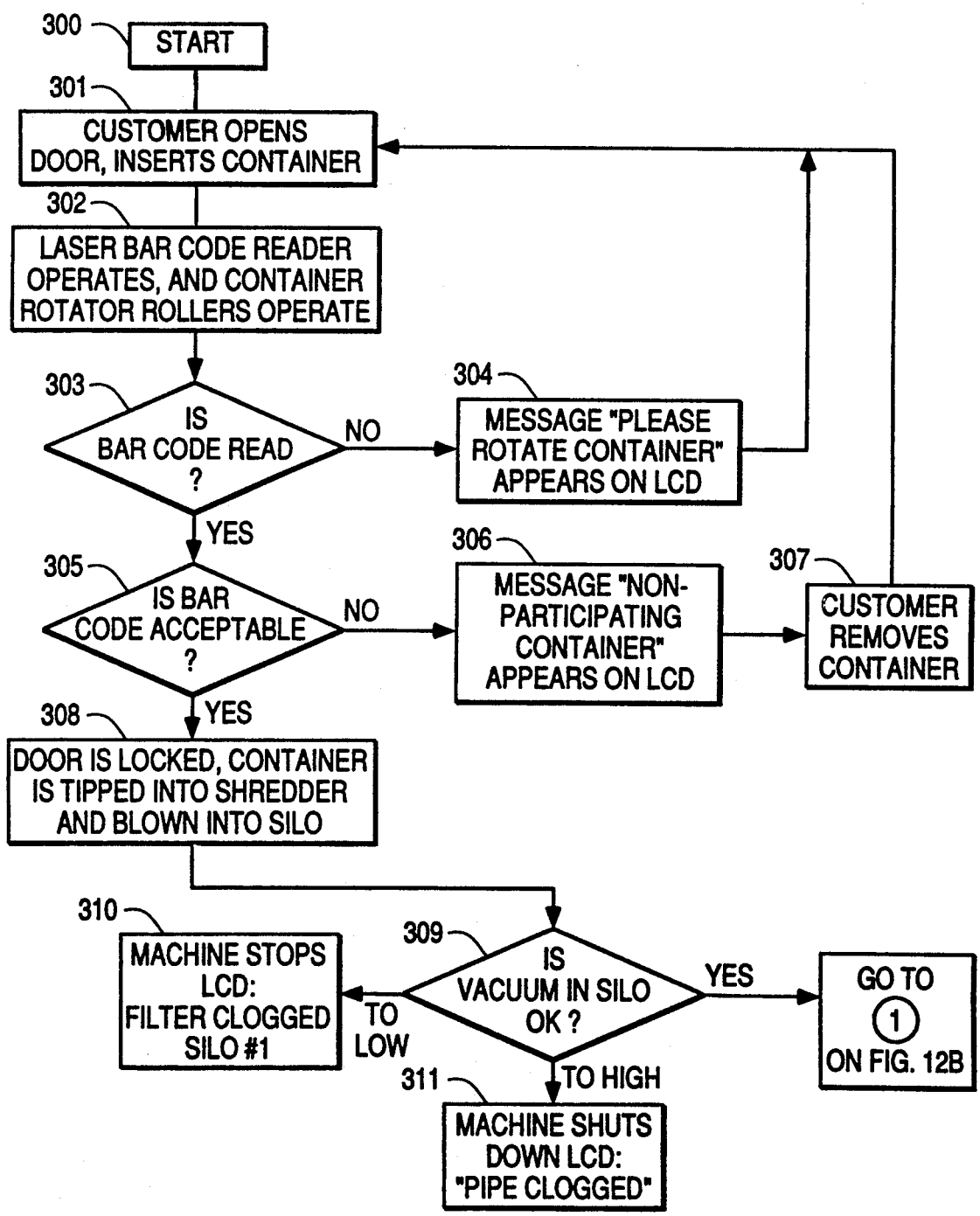
Figure 13:
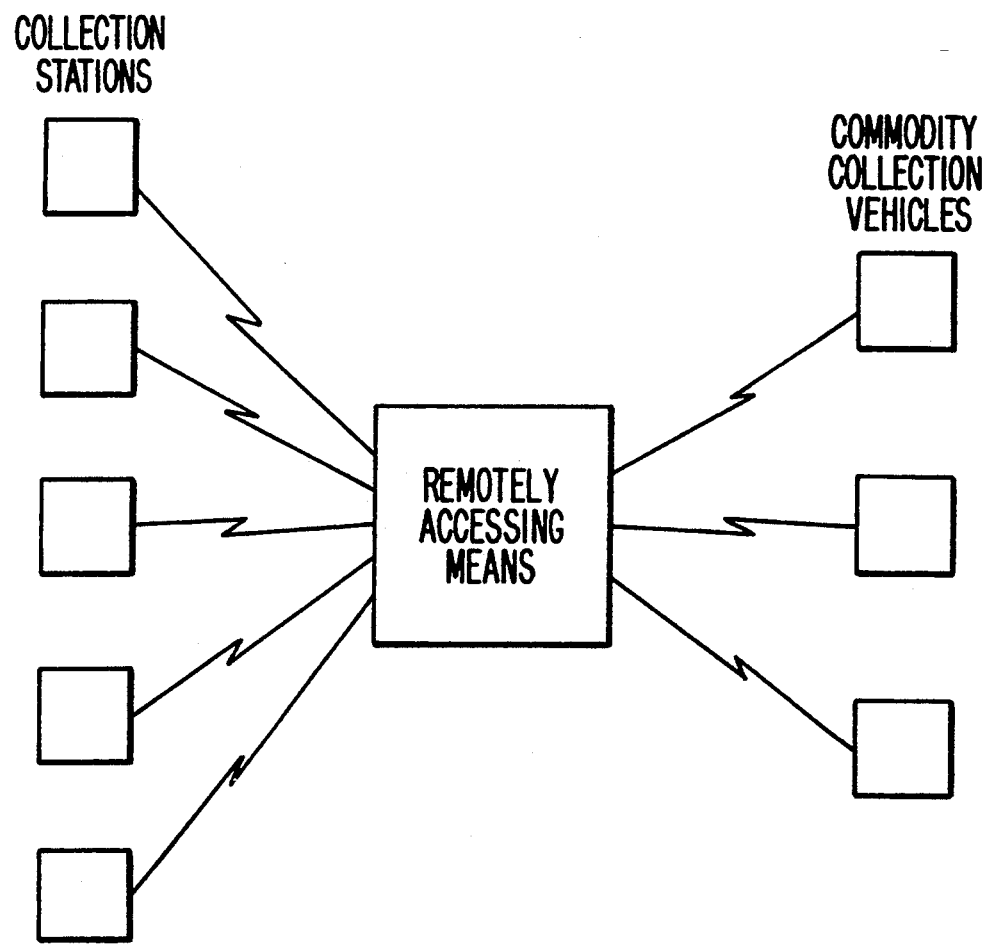
FIG. 13 is a block diagram schematically showing a plurality of collection stations, the remotely accessing means and the commodity collection vehicles of the present invention.

The plastic container machine 13 operates in substantially the same way as the glass machine 12, as shown in FIGS. 12A and 12B. In particular, the insertion sequence and the bar code reading are the same. Thereafter, there is no color recognition step necessary, and the machine goes directly to the shredding or densifying process (308). If the storage bin 32 is full, the machine shuts down (312, 313). However, FIG. 12B shows that the voucher may be issued for the plastic container even if the machine is out of service (314). This same option can be used with the other machines, if desired.

As is evident from the above, the system of the present invention provides for efficient and advantageous commodity collection and storage. The system minimizes the need for manual efforts in removing and storing densified commodities. In addition, it improves the visual appearance of the machines by allowing removal of the bulk storage from the immediate vicinity of the machines to a remote position which may be masked from the consumer's view. The use of printed coupons or vouchers eliminates time consuming resupply of coinage or currency. Failure or inoperative time may also be minimized by utilizing the remotely accessible microprocessor to communicate data on the machine operation state. In addition, data on the status of the commodity storage bins may be remotely accessed in order to efficiently route the commodity collection vehicles to the collection stations where the storage bins are full or near full.

As a result, the burden on retailers to manually sort containers, store containers and supply machines with coinage is greatly reduced. Also, the system allows a retailer to maintain a pleasant appearance within a retail outlet. Accordingly, it is believed that the present invention represents a significant advance in the art.

Additional advantages and modifications will readily occur to those skilled in the art. The invention in its broader aspects is therefore not limited to the specific details, representative apparatus and illustrative examples shown and described. Accordingly, departures may be made from such details without departing from the spirit or scope of the general inventive concept defined by the appended claims and their equivalence.

What is claimed is:

1. A multiple use commodity collection and storage system, comprising:
   a plurality of collection stations, each station for receiving a plurality of different predetermined post-consumer recyclable commodities, each station including:
   a. a plurality of reverse vending machines with a consumer selectable insert port being located in each machine, each port for receiving one different predetermined type of commodity, the size of each machine being within predetermined limits;
   b. pre-selection means associated with each insert port for automatically verifying that an inserted commodity is of the predetermined type;
   c. microprocessor means for storing data corresponding to the commodities verified by the pre-selection means; and
   d. means for densifying the commodities received in each insert port and verified by the pre-selection means to be of the predetermined type;
   bulk storage means remotely located from the collection stations, including at least one storage bin corresponding to each machine for separately storing each predetermined type of densified commodity, each bin being remotely positioned in relation to the corresponding machine for receiving commodities from the corresponding machine; and
   pneumatic means for conveying each predetermined type of densified commodity from each machine to the corresponding storage bin in the bulk storage means and continuously maintaining the segregation of the commodity types during the conveyance, the pneumatic means including a plurality of intake pipes, each intake pipe for receiving densified commodities from one machine and being in communication with a corresponding storage bin, suction means for creating suction, and a plurality of outlet tubes, each outlet tube being in communication with a corresponding storage bin and the suction means, the suction means drawing each predetermined type of densified commodity from the corresponding machine to the corresponding storage bin through the corresponding intake pipe via suction.

2. The system of claim 1 also including a plurality of commodity collection vehicles, each vehicle including a transport compartment and means for automatically loading the densified commodity of at least one of the predetermined types from the bulk storage means into the transport compartment.

3. The system of claim 2 wherein the transport compartment of each vehicle includes a plurality of separate segregated zones, each for receiving a different densified commodity from the bulk storage means.

4. The system of claim 3 wherein the predetermined commodities include aluminum, glass and plastic containers.

5. The system of claim 1, also including means for remotely accessing the microprocessor means of each station for centrally reading the data.

6. The system of claim 2, further comprising means for remotely accessing the microprocessor means of each station for centrally reading the data.

7. The system of claim 1, wherein each collection station further includes means for issuing at least one token in response to the receipt of a predetermined commodity.

8. The system of claim 6 wherein the remotely accessing means includes a central processing unit for analyzing the data from the plurality of stations, and routing the commodity collection vehicles to the stations on the basis of the data.

9. The system of claim 6 wherein each station also includes failure means for generating failure data when the station is inoperable, the remotely accessing means includes a central processing unit for receiving the failure data to indicate to an operator that the station is inoperable.

10. The system of claim 3 wherein the commodity collection vehicles each includes vacuum suction means for transferring each densified commodity from the bulk storage means to the corresponding segregated zone in the vehicle.

11. The system of claim 7 wherein the token includes a redeemable voucher.

12. The system of claim 7 wherein the token includes a coupon.

13. The system of claim 7 wherein the token includes a coin.

14. The system of claim 7 wherein each station also includes coupon printing means for printing and issuing redeemable coupons in response to commodities received and verified by the pre-selection means.

15. A multiple use commodity collection and storage system, comprising:
   a plurality of collection stations, each station for receiving a plurality of different predetermined post-consumer recyclable commodities, each station including:
   a. a plurality of reverse vending machines with a consumer selectable insert port being located in each machine, each port for receiving one different predetermined type of commodity, the size of each machine being within predetermined limits;
   b. pre-selection means associated with each insert port for automatically verifying that an inserted commodity is of the predetermined type;
   c. means for densifying the commodities received in each insert port and verified by the pre-selection means to be of the predetermined type;
   d. prestorage means including a separate space for each predetermined type of commodity; and
   e. transfer means for automatically transferring each predetermined type of densified commodity from the densifying means to the corresponding separate space in the prestorage means;

bulk storage means remotely located from the collection stations, including at least one storage bin corresponding to each machine for separately storing each predetermined type of densified commodity, each bin being remotely positioned in relation to the corresponding machine for receiving commodities from the corresponding machine; and pneumatic means for conveying each predetermined type of commodity from the prestorage means to the corresponding storage bin in the bulk storage means and continuously maintaining the segregation of the commodity types during the conveyance, the pneumatic means including a plurality of intake pipes, each intake pipe being in communication with the prestorage means of one of the stations and a corresponding storage bin, suction means for creating suction, and a plurality of outlet tubes, each outlet tube being in communication with a corresponding storage bin and the suction means, the suction means drawing each predetermined type of densified commodity from the prestorage means to the corresponding storage bin through the corresponding intake pipe via suction.

16. The system of claim 15 wherein the different commodities include aluminum, glass, and polymer resin.

17. The system of claim 16, wherein the glass includes green, brown and white glass, and the stations each include means for segregating the glass into separate storage bins for receiving the green, brown and white glass, respectively.

18. The system of claim 16 wherein the polymer resin includes high density polyethylene, polypropylene, polyvinyl chloride, and polyethylene terephthalate (PET).

19. The system of claim 15 wherein each collection station further includes means for issuing at least one token in response to the receipt of a predetermined commodity.

20. The system of claim 1, wherein the suction means comprises a single blower in communication with the plurality of storage bins via the outlet tubes.

21. The system of claim 15, wherein the suction means comprises a single blower in communication with the plurality of storage bins via the outlet tubes.

22. The system of claim 1, wherein the suction means comprises a plurality of blowers, each of the blowers being in communication with a single storage bin via a single corresponding outlet tube.

23. The system of claim 15, wherein the suction means comprises a plurality of blowers, each of the blowers being in communication with a single storage bin via a single corresponding outlet tube.

24. A method for collecting and storing a plurality of different predetermined post consumer commodities utilizing a plurality of collection stations each including a plurality of reverse vending machines, comprising the steps of:

inserting a commodity into one of a plurality of insert ports in a collection station, each machine having at least one of the ports, each of the ports being for receiving one different predetermined type of commodity;

verifying that the inserted commodity is of the predetermined type;

storing data corresponding to the verified commodities;

densifying the commodities received by the insert ports and verified to be the predetermined type;

separately storing each predetermined type of densified commodity remotely from the stations in one of a plurality of storage bins, each storage bin corresponding to one of the machines; and pneumatically conveying each predetermined type of densified commodity, after densifying, to the corresponding storage bin while continuously maintaining the segregation of the commodity types during the conveyance, each predetermined type of densified commodity being drawn by suction into the corresponding storage bin.

* * * * *

UNITED STATES PATENT AND TRADEMARK OFFICE
CERTIFICATE OF CORRECTION

PATENT NO. : 5,226,519

DATED : July 13, 1993

INVENTOR(S) : BRUCE H. DEWOOLFSON

It is certified that error appears in the above-identified patent and that said Letters Patent is hereby corrected as shown below:

Claim 14, column 10, line 42, change "claim 7" to --claim 1--.

Signed and Sealed this

Fifteenth Day of February, 1994

Attest:

BRUCE LEHMAN

Attesting Officer

Commissioner of Patents and Trademarks